(12) United States Patent
Suganuma et al.

(10) Patent No.: US 7,068,147 B2
(45) Date of Patent: Jun. 27, 2006

(54) CONTROL INFORMATION REWRITING SYSTEM

(75) Inventors: Takeshi Suganuma, Kariya (JP); Yoshimitsu Fujii, Okazaki (JP); Minoru Hozuka, Okazaki (JP)

(73) Assignee: Denso Corporation, Kariya (JP)

( * ) Notice: Subject to any disclaimer, the term of this patent is extended or adjusted under 35 U.S.C. 154(b) by 317 days.

(21) Appl. No.: 09/729,836

(22) Filed: Dec. 6, 2000

(65) Prior Publication Data

US 2001/0002814 A1 Jun. 7, 2001

(30) Foreign Application Priority Data

Dec. 7, 1999 (JP) .......................... 11-347562

(51) Int. Cl.
- G05B 19/00 (2006.01)
- G05B 23/00 (2006.01)
- G06F 7/00 (2006.01)
- G08B 29/00 (2006.01)
- H04Q 1/00 (2006.01)

(52) U.S. Cl. .............. 340/5.74; 340/5.31; 340/5.3; 701/29

(58) Field of Classification Search ........... 340/5.74, 340/5.6, 5.72, 825.69, 5.24, 5.63, 5.62, 5.31, 340/10.42; 307/10.5, 10.1, 10.3; 701/29, 701/35; 380/30, 270
See application file for complete search history.

(56) References Cited

U.S. PATENT DOCUMENTS

| | | | |
|---|---|---|---|
| 4,751,633 A | 6/1988 | Henn | |
| 5,278,759 A | 1/1994 | Berra | |
| 5,406,484 A | 4/1995 | Wurzenberger | |
| 5,473,540 A | 12/1995 | Schmitz | |
| 5,594,227 A * | 1/1997 | Deo | ............... 235/380 |
| 5,787,367 A | 7/1998 | Berra | |
| 5,802,485 A * | 9/1998 | Koelle et al. | ............... 701/29 |
| 5,815,071 A | 9/1998 | Doyle | |
| 5,838,251 A | 11/1998 | Brinkmeyer et al. | |
| 6,285,948 B1 * | 9/2001 | Takagi et al. | ............... 701/115 |
| 6,378,959 B1 * | 4/2002 | Lesesky et al. | ............... 364/200 |
| 6,529,124 B1 * | 3/2003 | Flick | ............... 340/426 |

FOREIGN PATENT DOCUMENTS

| | | |
|---|---|---|
| DE | 196 34 341 | 2/1998 |
| JP | 62-245341 | 10/1987 |
| JP | 3-238541 | 10/1991 |
| JP | 5-16744 | 1/1993 |
| JP | 6-328984 | 11/1994 |
| JP | 7-77101 | 3/1995 |
| JP | 11-175331 | 7/1999 |
| JP | 2000-373249 | 6/2004 |
| WO | WO 90/03724 | 4/1990 |

* cited by examiner

Primary Examiner—Brian Zimmerman
Assistant Examiner—Vernal Brown
(74) Attorney, Agent, or Firm—Posz Law Group, PLC

(57) ABSTRACT

In a control information rewriting system, a rewriting device for vehicle ECUs and a control center are provided. A function f necessary for the rewriting device to access the ECUs is stored the control center. When data communication is carried out by way of a telephone line network, the control center acquires ID information from the rewriting device and acquires a telephone number of the call origin. When the association relationship between this ID and telephone number matches an association relationship stored in the database, the control center determines the rewriting device to be a legitimate one. Only when the control center determines that the rewriting device is a legitimate one, it transmits the function f to the rewriting device to enable rewriting of control information of the ECUs.

38 Claims, 9 Drawing Sheets

CONTROL INFORMATION REWRITING SYSTEM

CROSS REFERENCE TO RELATED APPLICATION

This application is based on and incorporates herein by reference Japanese Patent Application No. 11-347562 filed Dec. 7, 1999.

BACKGROUND OF THE INVENTION

This invention relates to an electronic control information rewriting system having nonvolatile memory with which electrical rewriting of data is possible, and particularly relates to technology for preventing the illegitimate rewriting of control information such as vehicle control programs or control data stored in the nonvolatile memory.

In electronic control units (ECUs) for controlling vehicle engines or the like, control information is stored in a nonvolatile memory with which electrical rewriting of data is possible. The control information includes programs and data and is rewritable even in the market after production.

For instance, this kind of ECU is constructed as shown in FIG. 9. A rewriting device 200 is connected to a vehicle 100 via a vehicle diagnosis connector 120. A plurality of ECUs 101, 102, 103 and 104 are mounted in the vehicle 100, and the ECUs 101 through 104 are connected by a network line 110. The rewriting device 200 performs data communication with one of the four ECUs 101 through 104 by transmitting each ECU code on the basis of a manipulation of an operator.

In this system, as shown in FIG. 10, the rewriting device 200 selects the ECU 101, for instance, on which rewriting of control information is to be carried out, and transmits a rewriting request (b1). The selection of the ECU 101 is carried out by transmitting an ECU code. This ECU code is inputted to the rewriting device 200 by an operator. When this is done, the selected ECU 101 generates a random number r (b2), and transmits this random number r to the rewriting device 200 (b3).

A function f is pre-stored in the rewriting device 200, and it calculates a function value f(r) with respect to the transmitted random number r (b4). Then, it transmits this calculated function f(r) (b5). In the ECU 101, on the other hand, a function F is pre-stored, and a function value F(f(r)) is calculated with respect to the transmitted function value f(r) (b6). Then, if the calculated F(f(r)) corresponds to the random number r, that is if $f=F^{-1}$, it transmits a permission signal permitting rewriting (b7).

The above processing is for the ECU 101 to determine that the rewriting device 200 is legitimate when the rewriting device 200 has the inverse function f of the function F stored by the ECU 101.

The rewriting device 200, when receiving the permission signal transmitted from the ECU 101 (b8), transmits modification data. The ECU 101 carries out rewriting of control information on the basis of this modification data (b10). When the rewriting of control information completes normally, the ECU reports normal completion (b11), and the rewriting device receives the report (b12) and one chain of rewriting processing ends.

In the above rewriting processing by communication processing (b1 through b7) using the function f, which is information inside the rewriting device 200, each ECU determines the legitimacy of the rewriting device 200. As a result, when the rewriting device 200 itself is stolen or information inside the rewriting device 200 is stolen, illegitimate rewriting of control information cannot be prevented. In particular, because the rewriting device 200 is provided, for instance, at a work site such as a car dealer, the possibility of the above theft is relatively high.

SUMMARY OF THE INVENTION

It is therefore an object of the present invention to prevent illegitimate rewriting of control information even when a rewriting device or information inside a rewriting device is stolen.

According to the present invention, a control information rewriting system has a control center as an external device for conducting data communication with a rewriting device. The control center could for example be installed in a different place from a rewriting worksite. Access information is stored in the control center. Identification information and associated information are stored in the rewriting device. Identification information could be a number or the like unique to the rewriting device for identifying the rewriting device. Associated information is information set in association with identification information.

For the legitimacy determination, the control center acquires the identification information and the associated information of the rewriting device in data communication with the rewriting device. Then, when an association relationship of the acquired information matches an association relationship, it transmits predetermined access information to the rewriting device. On the other hand, when it does not match, the predetermined access information is not transmitted to the rewriting device.

That is, the system attains the following two-stage checks.

[1] The control center determines the legitimacy of the rewriting device and transmits access information to the rewriting device.

[2] The rewriting device executes communication start processing using that access information, and each electronic control unit determines the legitimacy of the rewriting device on the basis of that communication start processing.

Thus, if at least either one of the identification information or the associated information is not pre-stored inside the rewriting device, the rewriting device cannot obtain access information from the control center. Therefore, if the rewriting device or information inside the rewriting device is stolen, it is not determined by the electronic control unit that the rewriting device is legitimate. Thus, rewriting of control information is not carried out. As a result, even when the rewriting device or information inside the rewriting device is stolen, it is possible to prevent control information of an electronic control unit being improperly rewritten.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

An embodiment of the present invention will now be described with respect to rewriting of vehicle control information.

Figure 1:
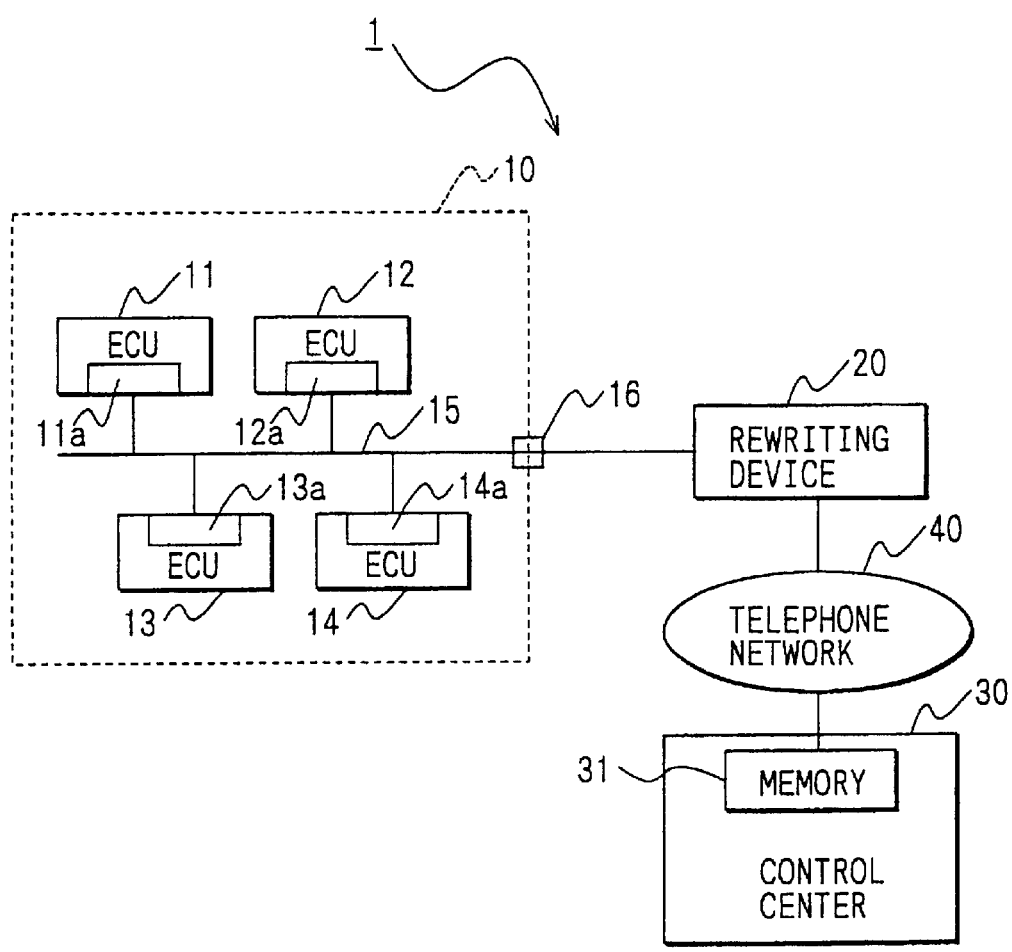
FIG. 1 is a block diagram showing a control information rewriting system according to an embodiment of the present invention.

Referring first to FIG. 1, a plurality of ECUs 11, 12, 13 and 14 are mounted in a vehicle 10, and the ECUs 11 through 14 are connected by a network line 15. The ECUs 11 through 14 have respective EEPROMs 11a through 14a which are nonvolatile type. At normal time, when a rewriting device 20 is not connected, on the basis of control information (control programs and control data) stored in this EEPROM, carry out communication between the ECUs 11 through 14 via the network line 15, and control respective control objects such as an engine.

In FIG. 1, the rewriting device 20 is shown as connected by way of a vehicle diagnosis connector 16 to the ECUs 11 so that a control information rewriting system 1 is formed. The vehicle diagnosis connector 16 is a connector provided on the vehicle 10 for making possible data communication between the rewriting device 20 and the ECUs 11 through 14 via the network line 15. The vehicle 10 and the rewriting device 20 are installed in a work site such as a car dealer or repair shop.

In the control information rewriting system 1 of this embodiment, the rewriting device 20 is capable of data communication via a telephone line network 40 with a control center 30. The control center 30 is installed as a so-called server as an external device in a different location from the work site. In a storage device (memory) 31 of this control center 30, access information for the rewriting device 20 to access the ECUs 11 through 14 with, modification data for rewriting or modifying control information, a database for determining the legitimacy of the rewriting device 20, and a database of control information update histories of different vehicles 10 are stored.

When the rewriting device 20 calls the control center 30, predetermined communication processing is carried out between the rewriting device 20 and the control center 30. The rewriting device 20 and the control center 30 assume a state such that data communication is possible. In FIG. 1, the control center 30 is shown as connected to a single rewriting device, but it is also conceivable for example for a rewriting device of a different work site to be connected to the control center 30 in parallel.

In this embodiment, the rewriting device 20 may be a portable personal computer which can be used for any types of vehicles. The control center 30 may be managed by a car manufacturer. The rewriting device 20 may be connected with the control center 30 by way of other means, for instance, cable TV network or wireless phone network, in place of ground telephone line network 40.

The operation of this control information rewriting system 1 is shown in block units B1 through B18. The processing in the ECUs 11 through 14 is shown as ECU side processing in a left side column in FIG. 2 as B5, B6, B9, B10, B15 and B16. The processing in the rewriting device 20 is shown as rewriting device side processing in a central column as B1, B4, B7, B8, B11, B14 and B17. The processing in the control center 30 is shown as control center side processing in a right side column as B2, B3, B12, B13 and B18. These processing are executed in the order B1→B2→B3→. . . →B18.

In operation, the rewriting device 20 first calls the control center 30. When a data communication possible state is established between the rewriting device 20 and the control center 30, the rewriting device 20 transmits to the control center 30 ID information as identification information for identifying the rewriting device 20 itself together with a communication start request (B1). With respect to this, the control center 30 receives the ID information from the rewriting device 20 and acquires the telephone number of the call origin, that is, the telephone number of the rewriting device 20 (B2). This telephone number is associated information.

The control center 30 has a database wherein the ID information of the rewriting device 20 and a telephone number assigned to the rewriting device 20 are associated. Accordingly, the control center 30 compares the association relationship between the received ID information and the acquired telephone number with an association relationship in the database (B2). If they match, it transmits a first permission signal and a function f to the rewriting device 20 (B3).

The rewriting device 20 selects an ECU to be the object of control information rewriting from among the ECUs 11 through 14, and transmits a rewriting request to that ECU (B4). It is assumed here that the ECU 11 has been selected as the ECU to be the object of control information rewriting. The selected ECU 11 generates a random number r (B5) and transmits this random number r to the rewriting device 20 (B6).

The rewriting device 20, using the function f transmitted to it from the control center in B3 above, calculates a function value f(r) with respect to the random number r from the ECU 11 (B7). Then, it retransmits this calculated function value f(r) to the ECU 11 (B8).

On the other hand, a function F is pre-stored in the ECU 11, and with respect to the function value f(r) transmitted from the rewriting device 20 it calculates a function value F(f(r)) (B9). Then, if the calculated function value F(f(r)) corresponds to the random number r, that is if $f=F^{-1}$, it transmits a second permission signal permitting rewriting and transmits a vehicle VIN code (B10). The vehicle VIN code is a number assigned uniquely to each vehicle, and this corresponds to the above vehicle information.

The rewriting device 20 receives the second permission signal and the vehicle VIN code from the ECU 11 and transmits these information on to the control center 30 (B11).

The control center 30 has respective control information update histories of each vehicle as a database. Accordingly, on the basis of the vehicle VIN code from the rewriting device 20, it carries out distinguishing of the vehicle 10, refers to the update history database, and determines the necessity of rewriting of control information (B12). When it determines that rewriting of control information to the vehicle 10 is necessary, it transmits modification data to the rewriting device 20 (B13).

The rewriting device 20 receives the modification data from the control center 30 and transmits this modification data to the ECU 11 (B14). The ECU 11, on the basis of the modification data from the rewriting device 20, performs rewriting of control information (B15). Then, if the rewriting of control information ends normally, it reports normal ending to the rewriting device 20 (B16). The rewriting device 20, when normal ending is reported from the ECU 11, erases the function f transmitted to it from the control center 30 in B3 above (B17). It reports normal ending to the control center 30. On the basis of this, the control center 30 updates the update history database (B18).

It is preferable that the functions f(r) and F(f(r)) are differentiated from vehicle type to vehicle type from the standpoint of security.

For the above processing, the ECUs 11 through 14, the rewriting device 20 and the control center 30 are programmed to operate as shown in FIGS. 3 through 8.

The ECU side processing executed in the ECUs 11 through 14 will be explained with reference to FIGS. 2 and 3. This ECU side processing is executed, with the rewriting device 20 connected by way of the vehicle diagnosis connector 16 to the vehicle 10, at a predetermined time interval such as for example 0.2 seconds.

First, at step (S) 300, it is determined whether or not there was a rewriting request from the rewriting device 20. When it is determined that there was a rewriting request (S300: YES), processing proceeds to S310. When on the other hand it is determined that there was not a rewriting request (S300: NO), this ECU side processing is terminated.

At S310, it is determined whether or not an access refusal timer is 0. The access refusal timer is set when it is determined a predetermined number of times in succession that the rewriting device 20 is not legitimate, as described above. When it is determined that the access refusal timer is not 0 (S310: NO), the timer is decremented at S320, and 0 is assigned to a variable C1, and this ECU side processing is terminated. The variable C1 counts the number of times in succession it is determined that the rewriting device is not legitimate. On the other hand, when it is determined that the access refusal timer is 0 (S310: YES), processing proceeds to S330.

At S330, it is determined whether or not the variable C1 is not greater than 2. When here C1>2 (S330: NO), at S340 the access refusal timer is set and this ECU side processing is terminated. In this embodiment, 10 minutes is set. On the other hand, when C1≦2 (S330: YES), processing proceeds to S350.

At S350, a random number r is generated, and transmitted to the rewriting device 20. This processing corresponds to the processing of B5 and B6 in FIG. 2. With respect to this, as shown in B8 in FIG. 2, a function value f(r) is transmitted from the rewriting device 20.

Accordingly, At the following S360, it is determined whether or not there was transmission of a function value f(r). When here there was transmission of a function value f(r) (S360: YES), processing proceeds to S370. On the other hand, as long as there is no transmission of a function value f(r) (S360: NO), this determination processing is repeated.

At S370, with respect to the function value f(r) transmitted from the rewriting device 20, a function value F(f(r)) is calculated. This processing corresponds to the processing of B9 in FIG. 2.

Figure 4:
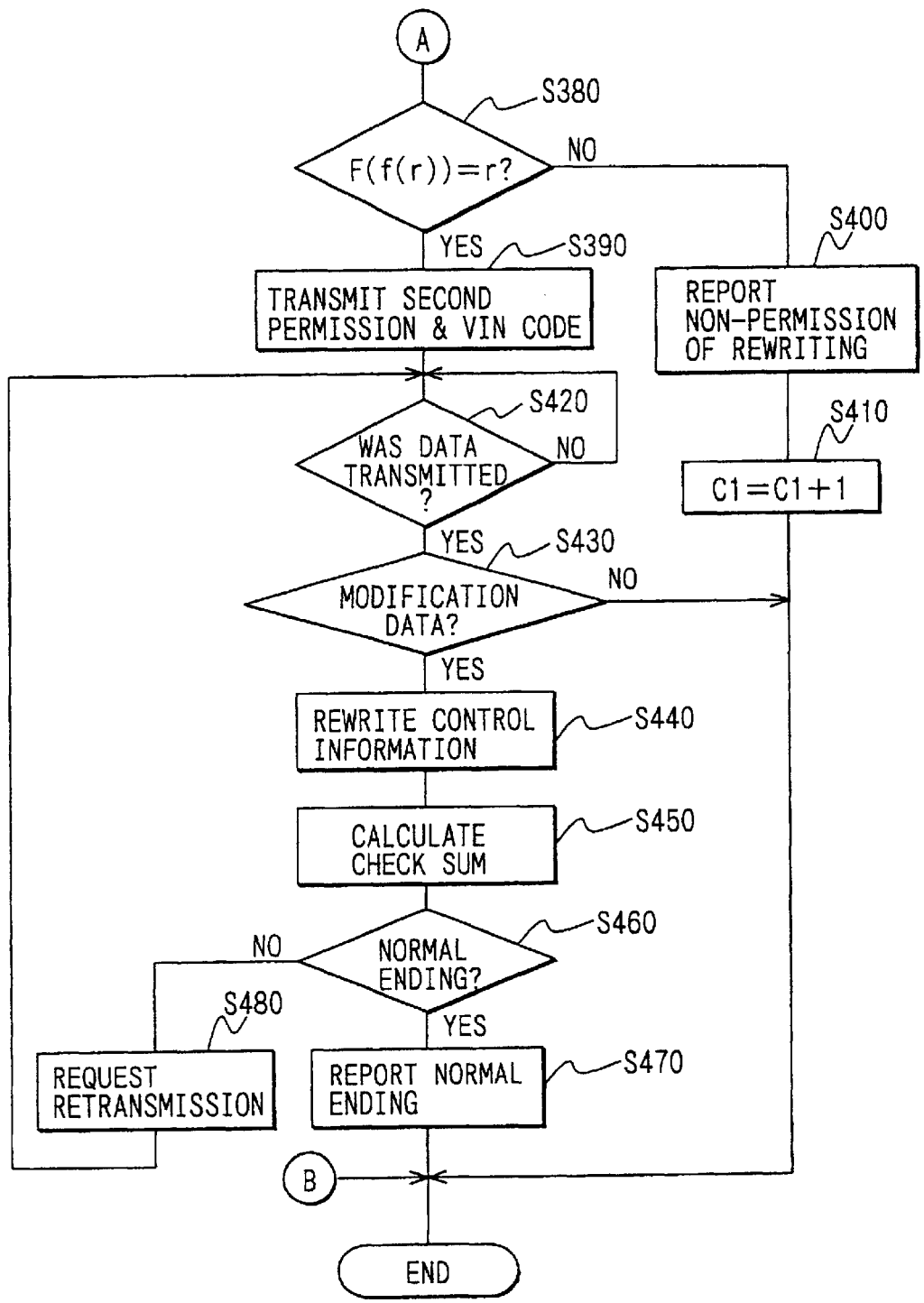
FIG. 4 is a flow diagram showing a second half of ECU side processing in the embodiment.

At the following S380 of FIG. 4, it is determined whether or not the calculated function value F(f(r)) corresponds to the random number r. When here F(f(r))=r (S380: YES), at S30 the second permission signal and the vehicle VIN code are transmitted, and processing proceeds to S420. The processing of S380 and S390 corresponds to the processing of B10 in FIG. 2. On the other hand, when F(f(r))≠r (S380: NO), it is reported at S400 to the rewriting device 20 that rewriting is not permitted, and at S410 the variable C1 is incremented and this ECU side processing is terminated. In this way the legitimacy of the rewriting device 20 is determined. When it is determined to be not legitimate (S380: NO), the variable C1 is incremented (S410), and at C1>2 the timer is set as described above (S340 in FIG. 2). Thus, in this embodiment, when it is determined three times in succession that the rewriting device 20 is not legitimate, by C1 0→1→2, access refusal is carried out.

By the control center 30 a control information rewriting necessity determination based on the vehicle VIN code is carried out. If rewriting is necessary modification data is transmitted from the control center 30 via the rewriting device 20. On the other hand, if rewriting is not necessary, that is, when rewriting of control information has been carried out already, information indicating that rewriting has been done is transmitted from the control center 30 via the rewriting device 20.

For this, at S420, it is determined whether or not there was data transmission from the rewriting device 20. When it is determined that there was data transmission (S420: YES), processing proceeds to S430. On the other hand, as long as there is no data transmission (S420: NO), this determination processing is repeated.

Then, at S430, it is determined whether or not the data transmitted from the rewriting device 20 is modification data. When it is determined that it is modification data (S430: YES), processing proceeds to S440. On the other hand, when it is determined that it is not modification data (S430: NO), that is, when information indicating that rewriting has been done was transmitted, the subsequent processing is not executed and this ECU side processing is terminated.

At S440, on the basis of the transmitted modification data, rewriting of control information is carried out. At the following S450, a post-rewriting check sum of control information is calculated. This is for determining whether or not the control information was rewritten normally.

Then, at the next S460, on the basis of the check sum calculated at S450, it is determined whether or not the rewriting of control information ended normally. When it is determined that it ended normally (S460: YES), at S470 normal ending is reported to the rewriting device 20, and after that this ECU side processing is terminated. On the other hand, when it is not determined that it ended normally (S460: NO), at S480 the rewriting device 20 is requested to retransmit the modification data, and the processing from S420 is repeated.

Figure 5:
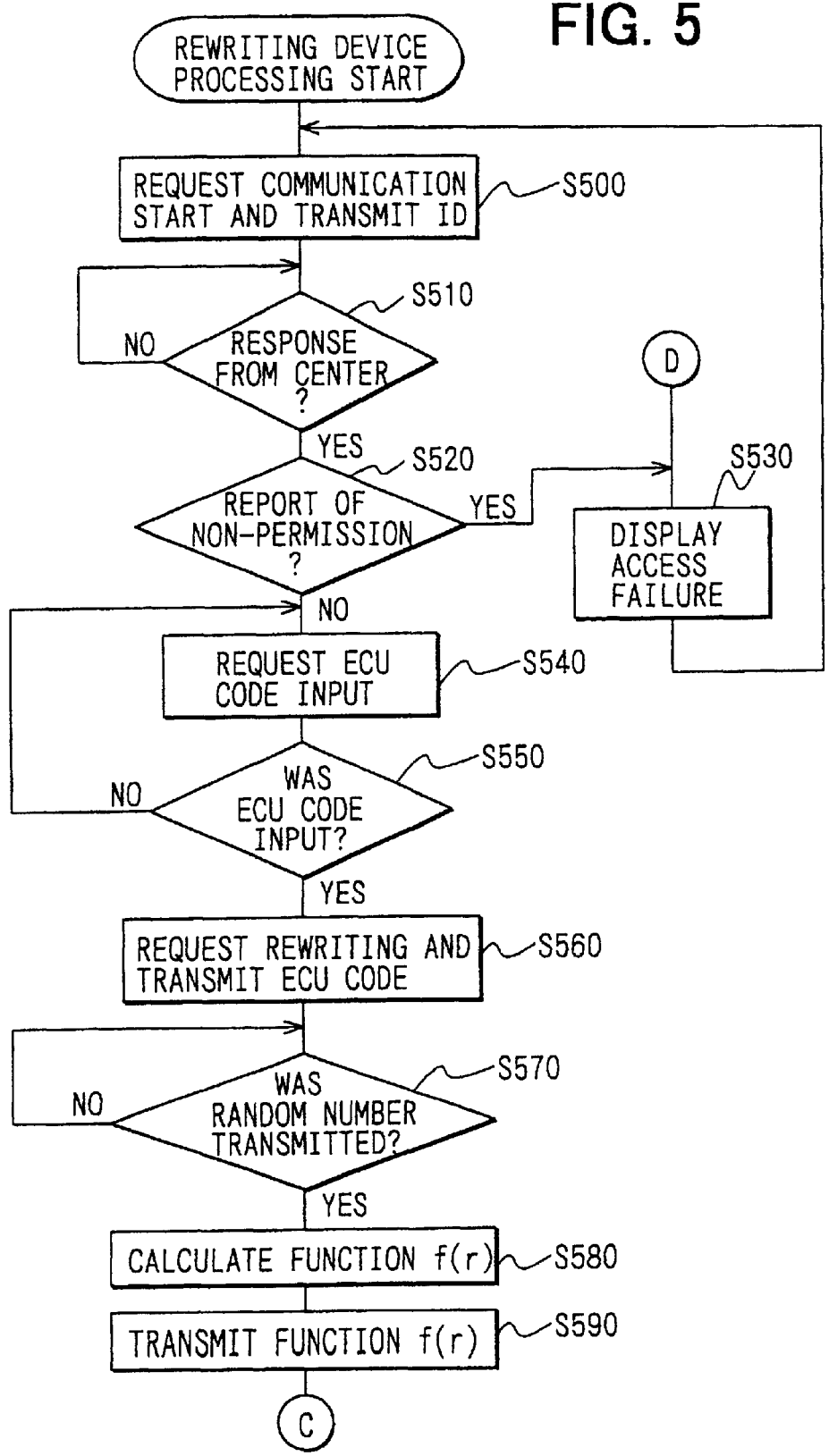
FIG. 5 is a flow diagram showing a first half of rewriting device side processing in the embodiment.

Now on the basis of the flow diagram of FIG. 5 and FIG. 6, the rewriting device side processing executed by the rewriting device 20 will be described. This rewriting device side processing is executed with a predetermined manipulation carried out by an operator as a trigger, after a data communication possible state is established between the rewriting device 20 and the control center 30.

First at S500, with respect to the control center 30, a communication start is requested and a pre-stored ID information is transmitted. This processing corresponds to the processing of B1 in FIG. 2.

The control center 30, when determining that the rewriting device 20 is a legitimate one, transmits the first permission signal and the function f. Accordingly, at the following S510, it is determined whether or not there was a response from the control center 30. When it is determined that there was a response from the control center 30 (S510: YES), processing proceeds to S520. On the other hand, as long as there is no response from the control center 30 (S510: NO), this determination processing is repeated.

At S520, it is determined whether or not the response of the control center 30 is a report of non-permission. When it is determined that it is a report of non-permission (S520: YES), at S530 it is displayed on a display device such as a display that there has been a failure to access the control center 30. After that, the processing from S500 is repeated. On the other hand, when it is not a report of non-permission (S520: NO), that is, when the first permission signal and the function f have been transmitted, processing proceeds to S540.

At S540, the input of an ECU code for selecting one of the four ECUs 11 through 14 mounted in the vehicle 10 is requested of the operator. At the following S550, it is determined whether or not there was the input of an ECU code. When it is determined that there was the input of an ECU code (S550: YES), processing proceeds to S560. On the other hand, as long as there is no input of an ECU code (S550: NO), the processing from S540 is repeated. The following description will be continued assuming that the ECU code of the ECU 11 was inputted.

At S560, a rewriting request and the ECU code are transmitted. This processing corresponds to the processing of B4 in FIG. 2. On the basis of this, the ECU 11 generates a random number r and transmits that random number r (S350 in FIG. 3).

Accordingly, at the following Step S570, it is determined whether or not a random number r has been transmitted. When it is determined that a random number r has been transmitted (S570: YES), processing proceeds to S580. On the other hand, as long as no random number r is transmitted (S570: NO), this determination processing is repeated.

At S580, using the function f transmitted from the control center 30 at S510, a function value f(r) specific to the random number r is calculated. At the next S590, the function value f(r) is transmitted to the ECU 11. This corresponds to the processing of B7 and B8 in FIG. 2.

Figure 3:
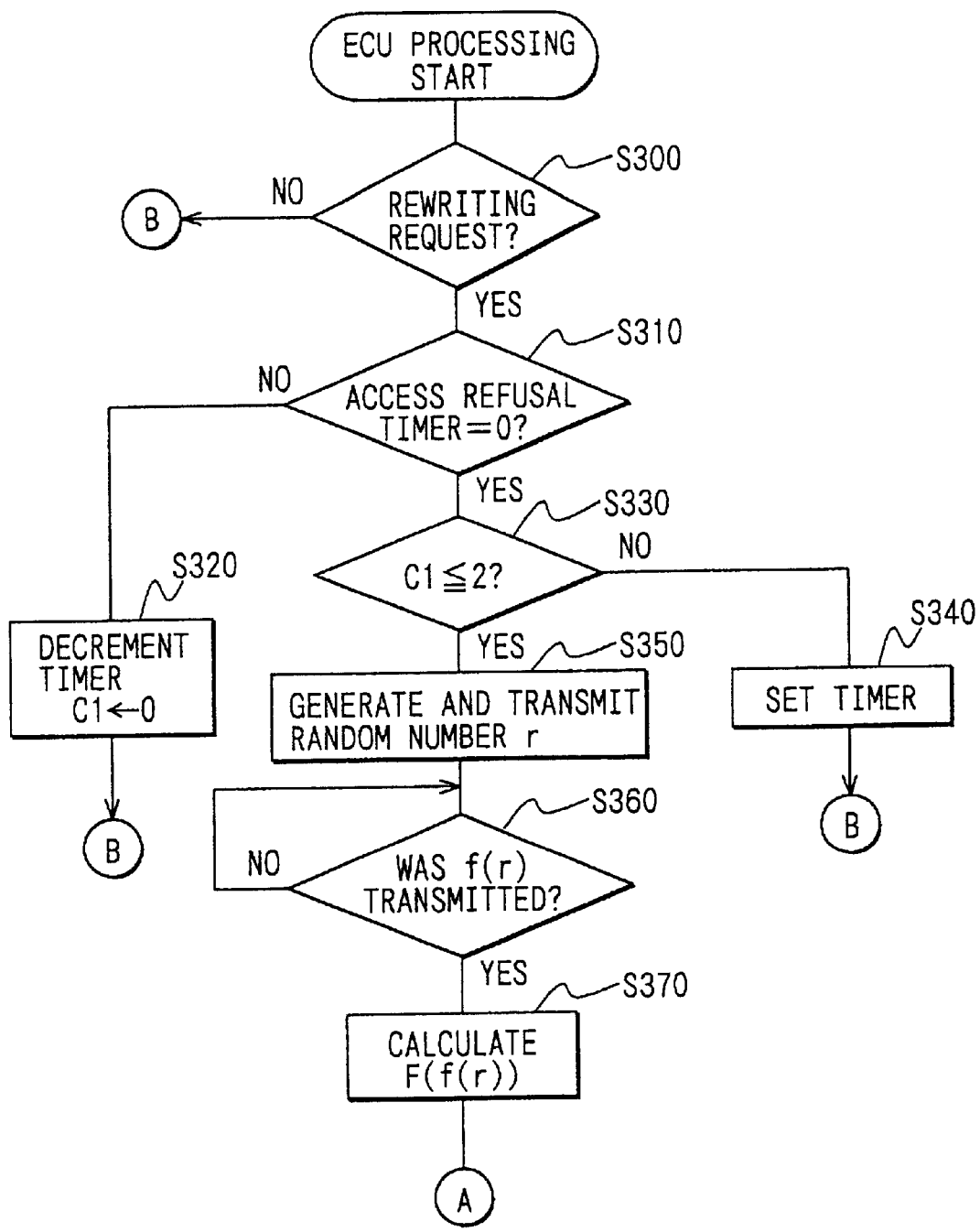
FIG. 3 is a flow diagram showing a first half of ECU side processing in the embodiment.

With respect to this, in the ECU 11, an affirmative determination is made at S360 in FIG. 3, and the function value F(f(r)) is calculated (S370). Then, on the basis of the determination of S380, transmission of a second permission signal or reporting that rewriting will not be permitted is carried out (S390, S400).

Figure 6:
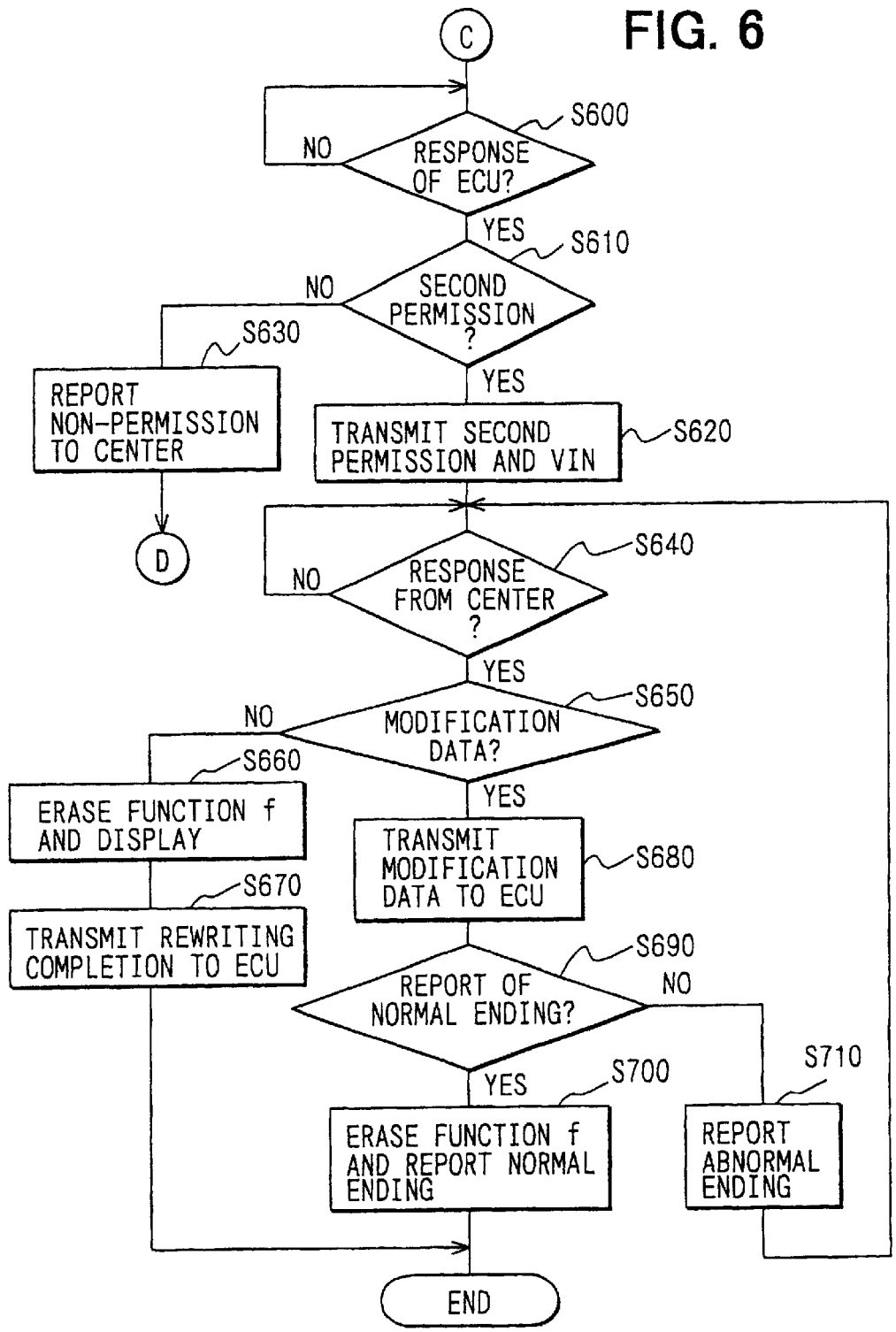
FIG. 6 is a flow diagram showing a second half of rewriting device side processing in the embodiment.

Accordingly, at the following S600 of FIG. 6, it is determined whether or not there was a response from the ECU 11. When it is determined that there was a response of the ECU 11 (S600: YES), processing proceeds to S610. On the other hand, as long as there is no response from the ECU 11 (S600: NO), this determination processing is repeated.

At S610, it is determined whether or not a second permission signal was transmitted from the ECU 11. When it is determined that a second permission signal was transmitted (S610: YES), at S620 the second permission signal and the vehicle VIN code transmitted together with that second permission signal are transmitted to the control center 30, and after that processing proceeds to S640. This processing corresponds to the processing of B11 in FIG. 2. On the other hand, when a second permission signal was not transmitted (S610: NO), that is, when it was reported from the ECU 11 that rewriting will not be permitted, at S630 it is reported to the control center 30 that permission has not been given, and after that, processing proceeds to S530 in FIG. 5.

When at S620 the second permission signal and the vehicle VIN code are transmitted to the control center 30, the control center 30 determines the necessity of rewriting. If there is a need for rewriting, the control center 30 transmits modification data. On the other hand, if there is no need for rewriting, the control center 30 transmits information indicating that rewriting has been done.

Accordingly, at S640, it is determined whether or not there was a response from the control center 30. When it is determined that there was a response from the control center 30 (S640: YES), processing proceeds to S650. On the other hand, as long as there is no response (S640: NO), this determination processing is repeated.

At S650, it is determined whether or not the data transmitted from the control center 30 is modification data. When it was modification data (S650: YES), processing proceeds to S680. On the other hand, when it is not modification data (S650: NO, that is, when information indicating that rewriting has been done was transmitted from the control center 30, the function f is erased and it is displayed that there is no need for rewriting (S660). Information indicating that rewriting has been done is transmitted to the ECU 11 (S670). This rewriting device side processing is then terminated.

At S680, the modification data transmitted from the control center 30 is transmitted to the ECU 11. This processing corresponds to the processing of B14 in FIG. 2. On the basis of this, in the ECU 11 rewriting of control information is carried out (S430 in FIG. 4: YES, S440), and a report of normal ending or a re-transmission request is transmitted from the ECU 11 (S470, 480).

Accordingly, at the next S690, it is determined whether or not there was a report of normal ending from the ECU 11. When it is determined that there was a report of normal ending (S690: YES), the function f is erased and normal ending is reported to the control center 30 (S700), and after that this rewriting device side processing is terminated. On the other hand, when there was not a report of normal ending (S690: NO), that is, when there was a request for re-transmission of the modification data, abnormal ending is reported to the control center 30 (S710) and this rewriting device side processing is terminated.

Figure 7:
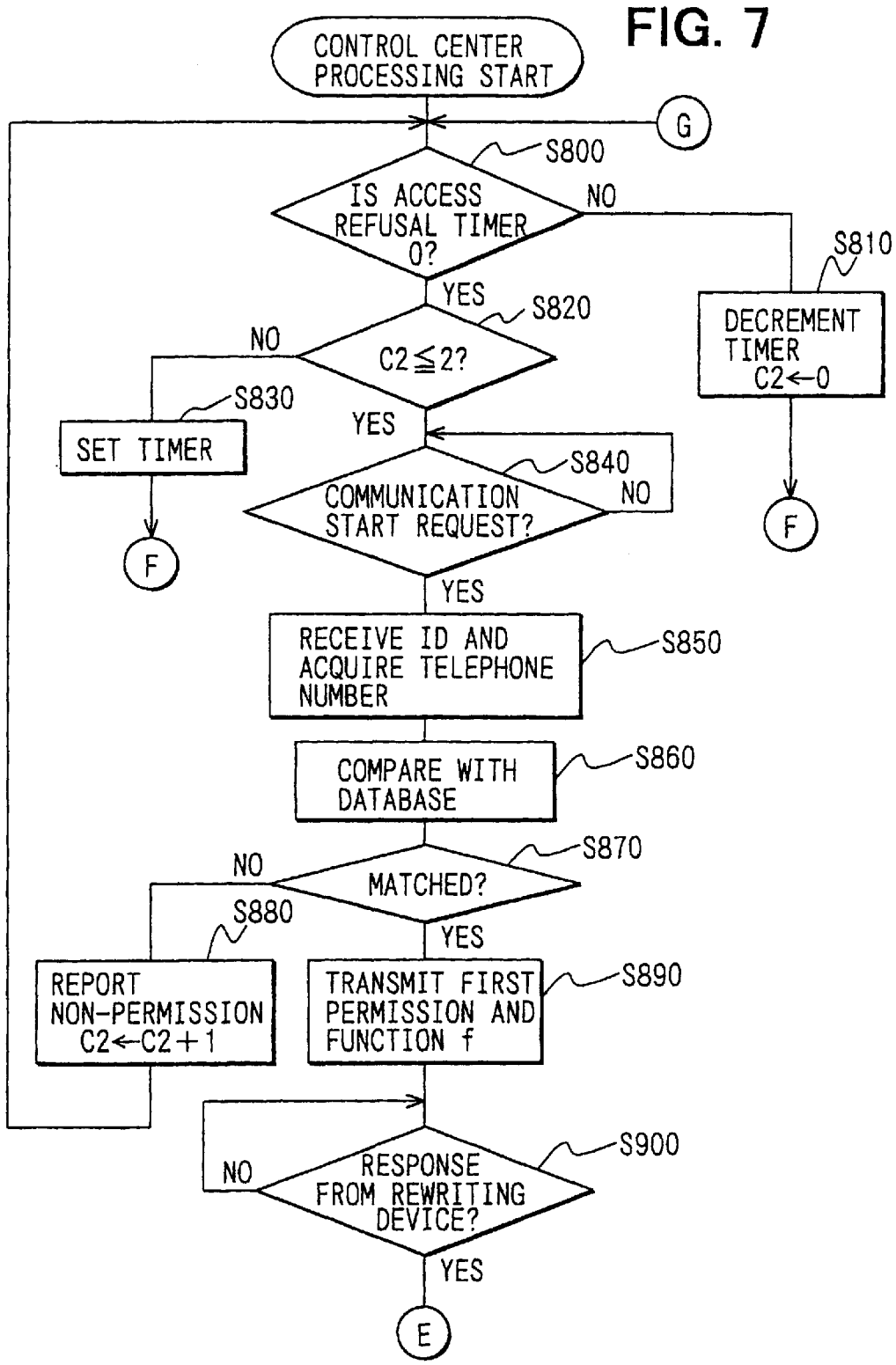
FIG. 7 is a flow diagram showing a first half of control center side processing in the embodiment.
Figure 8:
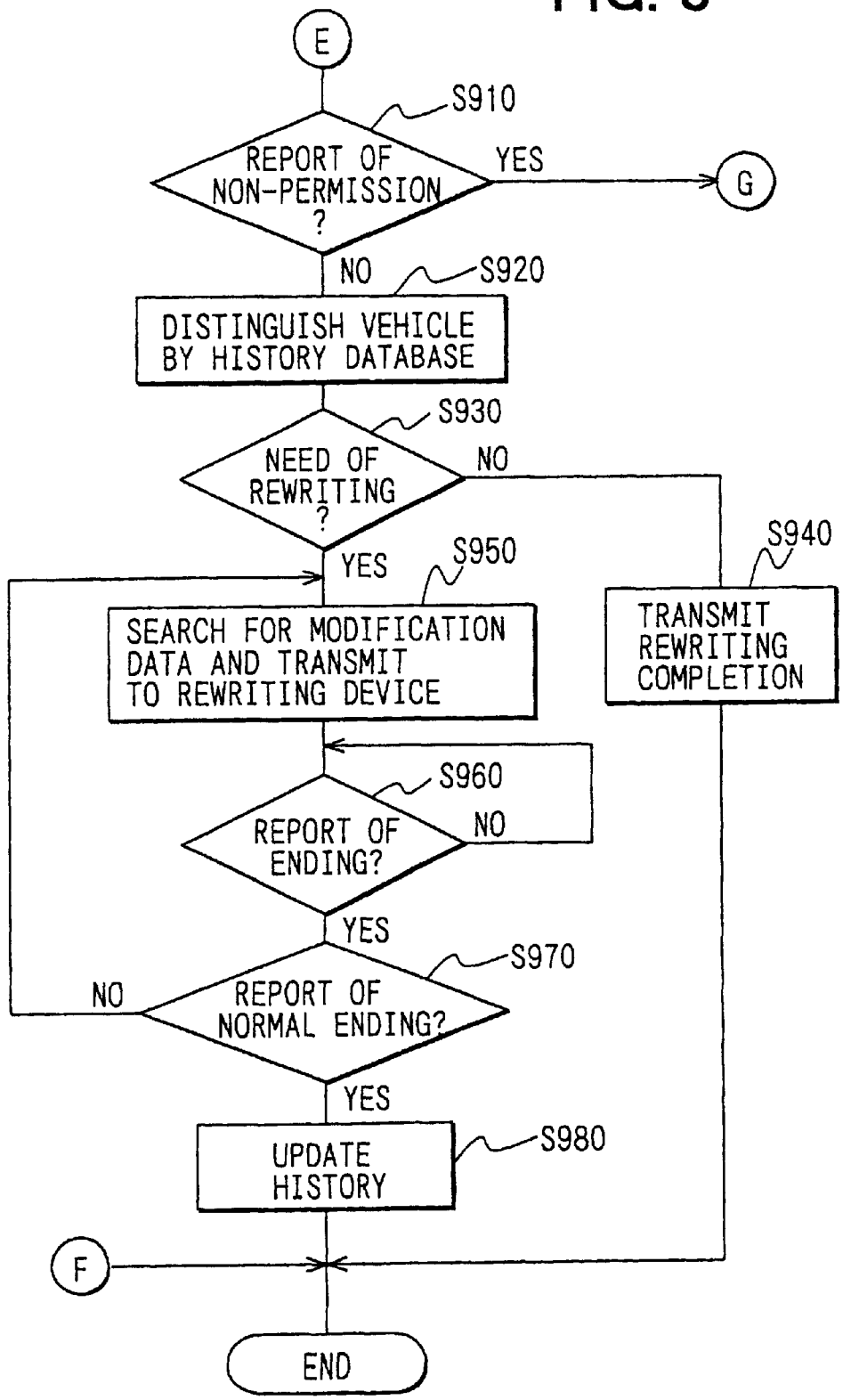
FIG. 8 is a flow diagram showing a second half of control center side processing in the embodiment.
Figure 9:
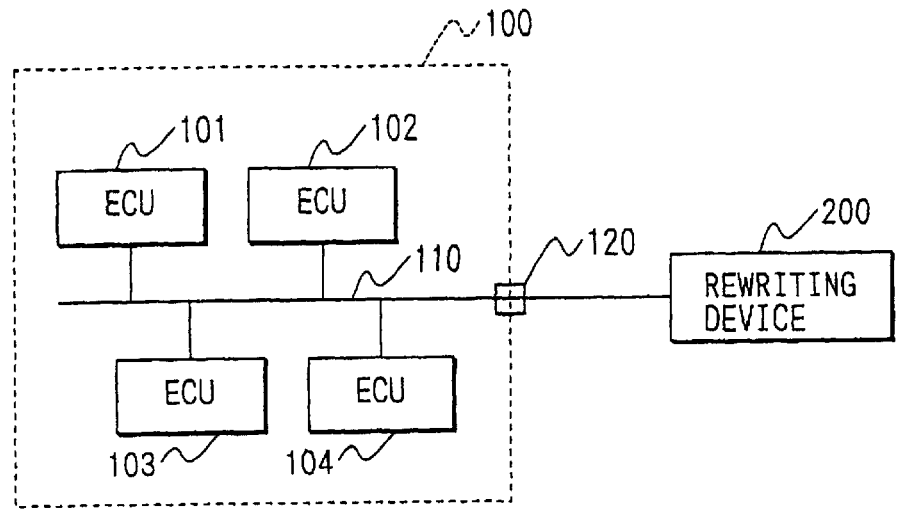
FIG. 9 is a block diagram showing a control information rewriting system according to a related art.
Figure 10:
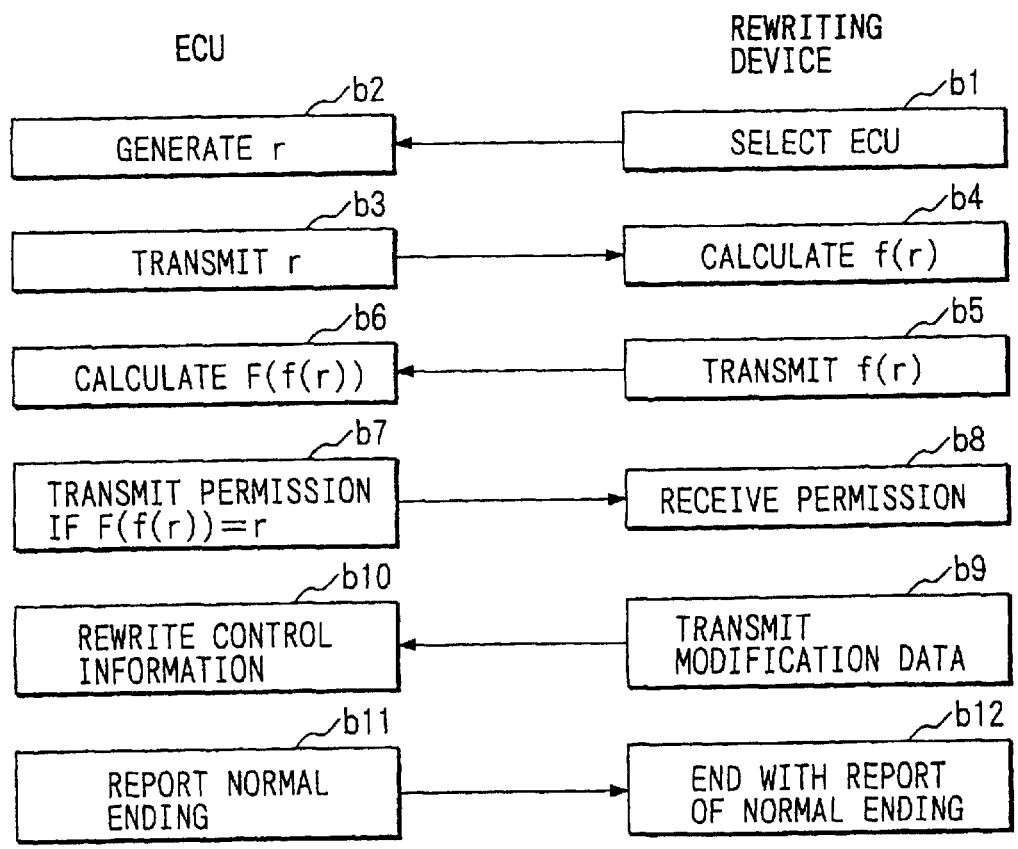
FIG. 10 is an operation diagram showing rewriting processing in the related art.

Continuing further, on the basis of the flow diagram of FIG. 7 and FIG. 8, the control center side processing executed by the control center 30 will be described. This control center side processing is executed, with a data communication possible state established between the rewriting device 20 and the control center 30, at a predetermined time interval such as for example 0.2 seconds.

First, at S800, it is determined whether or not the access refusal timer is 0. The access refusal timer is set when it is determined a predetermined number of times in succession by the control center 30 that the rewriting device 20 is not legitimate, as will be further discussed later. When it is determined that the access refusal timer is not 0 (S800: NO), at S810 the timer is decremented. Further, 0 is assigned to a variable C2, and this control center side processing is terminated. The variable C2 counts the number of times in succession it is determined by the control center 30 that the rewriting 20 is not legitimate. On the other hand, when it is determined that the access refusal timer is 0 (S800: YES), processing proceeds to S820.

At S820, it is determined whether or not the variable C2 is not greater than 2. When here C2>2 (S820: NO), at S830 the access refusal timer is set, and after that, this control center side processing is terminated. On the other hand, when $C2 \leq 2$ (S820: YES), processing proceeds to S840.

At S840, it is determined whether or not there was a communication start request. This processing is specific to the processing of S500 in FIG. 5. When it is determined that there was a communication start request (S840: YES), processing proceeds to S850. On the other hand, as long as there is no communication start request (S840: NO), this determination processing is repeated.

At S850, the ID information transmitted from the rewriting device 20 is received and the telephone number of the call origin is acquired. At the following S860, the association relationship between the received ID information and the acquired telephone number is compared with the association relationship between the ID information and the telephone number of the rewriting device 20 pre-stored in the database. The processing of these S850 and S860 corresponds to the processing shown in B2 of FIG. 2.

Then, at the next S870, on the basis of the comparison result, it is determined whether or not the association relationships match. When it is determined that they matched (S870: YES), at S890 the first permission signal and the function f are transmitted, and after that, processing proceeds to S900. This processing corresponds to the processing of B3 in FIG. 2. On the other hand, when it is determined that they did not match (S870: NO), it is reported to the rewriting device 20 that rewriting will not be permitted, and the variable C2 is incremented (S880), and after that, the processing from S800 is repeated.

The processing of S850 to S890 explained here corresponds to processing serving as legitimacy determining means. Therefore, the CPU of the control center 30 thus executes legitimacy determination.

When the first permission signal and the function f are transmitted, the rewriting device 20 transmits back the second permission signal and the vehicle VIN code (S620 in FIG. 6), or reports the non-permission of rewriting (S630).

Accordingly, at S900, it is determined whether or not there was a response from the rewriting device 20. When it is determined that there was a response from the rewriting device 20 (S900: YES), processing proceeds to S910 in FIG. 8. On the other hand, as long as there is no response from the rewriting device 20 (S900: NO), this determination processing is repeated.

At S910, it is determined whether or not that response is a report of non-permission. When it was a report of non-permission (S910: YES), processing proceeds to S800 in FIG. 7. On the other hand, when it is not a report of non-permission (S910: NO), that is when the second permission signal and the vehicle VIN code were transmitted, processing proceeds to S920.

At S920, distinguishing of the vehicle is carried out on the basis of the transmitted vehicle VIN code, and the update history database is referred to. Then, at the next S930, on the basis of the reference result, it is determined whether or not there is a need to rewrite control information. The processing of these S920 and S930 corresponds to B12 in FIG. 2. When it is determined that there is a need of rewriting (S930: YES), processing proceeds to S950. On the other hand, when it is determined that there is no need of rewriting (S930: NO), at S940 information indicating that rewriting has been done is transmitted, and after that, this control center side processing is terminated.

At S950, modification data is searched for and read out, and the modification data read out is transmitted to the rewriting device 20. This processing corresponds to the processing of B13 in FIG. 2. After that, from the rewriting device 20, as described above there is a report of normal ending (S700 in FIG. 6) or a report of abnormal ending (S710).

Accordingly, at S960, it is determined whether or not there was an ending report from the rewriting device 20. When it is determined that where was an ending report (S960: YES), processing proceeds to S970. On the other hand, as long as there is no ending report (S960: NO), this determination processing is repeated.

At S970, it is determined whether or not the ending report is a report of normal ending. When it is determined that it is a report of normal ending (S970: YES), at S980 the update history database is updated, and after that, this control center side processing is terminated. On the other hand, when it is determined that it is not a report of normal ending (S970: NO), that is, when it was a report of abnormal ending, the processing from S950 is repeated.

According to the above embodiment, the function f constituting access information is stored in the control center 30. Only when the control center 30 determines the rewriting device 20 to be a legitimate one, the function f is transmitted from the control center 30 to the rewriting device 20 (B2, B3 in FIG. 2). Therefore, even when the rewriting device 20 or information inside the rewriting device 20 is stolen, the access information for accessing the ECUs 11 through 14 is not stored in the rewriting device 20. Therefore, it is not possible to rewrite the control information of the ECUs 11 through 14, if it is not possible to obtain access information from the control center 30.

The control center 30 has a database in which ID information uniquely assigned to the rewriting device 20 and a telephone number of the rewriting device 20 side of when data communication is to be carried out via a telephone line are stored in association. It acquires ID information from the rewriting device 20 and acquires the telephone number from which the call was made (S850 in FIG. 7). When the association relationship between this ID and telephone number matches the association relationship stored in the database (S860, S870: YES), the control center 30 determines that the rewriting device 20 is legitimate and transmits the function f, which is access information (S890). For example when a line is connected between the rewriting device 20 and the control center 30 from other than a regular work site, the telephone number that the control center 30 acquires ceases to be the pre-decided telephone number. Consequently, it does not correspond with the ID information, and the access information cannot be obtained from the control center 30. As a result, it is not possible to rewrite the control information in the ECUs 11 through 14.

As described above, with the control information rewriting system 1 of this embodiment, even when the rewriting device 20 or information inside the rewriting device 20 is stolen, control information of the ECUs 11 through 14 being improperly rewritten can be certainly prevented.

With the control information rewriting system 1 of this embodiment, the control center 30 firstly determines the legitimacy of the rewriting device 20 and then the ECUs 11 through 14 determine the legitimacy of the rewriting device 20. When in either of these checks of two stages it is determined three times in succession that the rewriting device 20 is not legitimate, a ten minute access refusal is carried out.

That is, in the ECUs 11 through 14, when it is determined that the rewriting device 20 is not legitimate (S380: NO in FIG. 4), the variable C1 is incremented (S410). When the variable C1 becomes larger than 2 (S330: NO in FIG. 3), that is, when a determination of not legitimate is made three times in succession, an access refusal timer is set (S340). Thus, access of the rewriting device 20 is refused (S310: NO) until the timer becomes 0.

Meanwhile, similarly in the control center 30 also, when it is determined that the rewriting device 20 is not legitimate (S870: NO in FIG. 7), the variable C2 is incremented (S880). When the variable C2 becomes larger than 2 (S820: NO), that is, when a determination of not legitimate is made three times in succession, an access refusal timer is set (S830). Thus, access of the rewriting device 20 is refused (S800: NO) until the timer becomes 0.

As a result, even when an attempt is made to access the control center 30 or the ECUs 11 through 14 from the rewriting device 20 using illegitimate information, the control information rewriting prevention can be prevented. Because it is not possible to access many times in succession, for the reason that access becomes impossible for ten minutes, if illegitimate access is carried out three times in succession.

In this embodiment, the control center 30 stores modification data of control information. That is, because modification data is not stored in the rewriting device 20 as in the past, even when the rewriting device 20 or information inside the rewriting device 20 is stolen, there is no possibility of modification data leaking to outside.

The control center 30 transmits modification data (S950) with a second permission signal from the ECUs 11 through 14 having been transmitted to it as one condition (S910: NO). That is, it transmits modification data with it having been determined by the ECUs 11 through 14 that the rewriting device 20 is legitimate as a condition. Therefore, the possibility of modification data leaking to outside is further reduced.

When the ECUs 11 through 14 determine that the rewriting device 20 is legitimate (S380: YES in FIG. 4), in addition to the second permission signal, they transmit a vehicle VIN code with which it is possible to specify the vehicle 10 (S390). The control center 30 has a database of update histories of control information stored in the ECUs 11 through 14 of different vehicles 10, and on the basis of the above-mentioned vehicle VIN code from the ECUs 11 through 14, distinguishes the vehicle 10 and refers to the database (S920 in FIG. 8) and determines the necessity of control information rewriting (S930). Then, when there is a need of rewriting (S930: YES), it transmits the modification data (S950).

In this embodiment, because the control center 30 manages the control information update histories of vehicles 10, futile rewriting of control information is not carried out. As a result, futile work time is not needed, and it ceases to happen that a necessary rewriting becomes impossible due to futile rewriting.

In the control center 30, when normal ending of rewriting is reported from the ECUs 11 through 14 via the rewriting device 20 (S970: YES in FIG. 8), the control information update history database is updated automatically (S980). Thus, there is no need for an operator to update the database by a manual operation.

In the rewriting device 20, when the function f constituting access information ceases to be needed (S650: NO, S690: YES in FIG. 6), that function f constituting access information is swiftly erased (S660, S700). Because of this, the possibility of the function f serving as access information transmitted from the control center 30 to the rewriting device 20 being stolen from the rewriting device 20 can be reduced.

This invention is not limited in any way to the disclosed embodiment, but may be implemented in other ways without departing from the spirit of the invention as follows.

(1) The control center 30 may have a database wherein the ID information of rewriting devices 20 and passwords are associated, and the rewriting device 20 may transmits a password inputted by an operator together with the ID information. In this case, the password corresponds to associated information, and the control center 30 determines the legitimacy of the rewriting device 20 on the basis of the correspondence between the ID information and the password transmitted from the rewriting device 20.

The ID information may also be inputted from a user in the same way as the password. If this is done, even when the rewriting device 20 or information inside the rewriting device 20 is stolen, because the password or the ID information and the password are not known, it is not possible to obtain access information from the control center 30, and it is possible to prevent the improper rewriting of control information in the same way as in the embodiment described above.

However, because there is also a possibility of the ID information or the password being stolen by some other route, it is preferable for a telephone number connected with the installation site of the rewriting device 20 to be made associated information as in the embodiment described above. This is because improper rewriting is not carried out at a regular work site.

(2) It is conceivable for data communication between the control center 30 and the rewriting device 20 to be ended temporarily after the rewriting device 20 acquires the access information from the control center 30. For example, it is conceivable for data communication to be temporarily ended after the data communication of B1 through B4 in FIG. 2 finishes and for a data communication possible state between the rewriting device 20 and the control center 30 to be re-established when the processing of B11 onwards is carried out.

However, there is a possibility of access information transmitted to the rewriting device 20 being stolen and the ECUs 11 through 14 being accessed using this access information, using a different rewriting device.

Therefore, it is beneficial if the control center 30 and the rewriting device 20 being in a data communication possible state is made a condition of rewriting until the chain of rewriting processing (the processing of B1 through B18 shown in FIG. 2) ends.

Specifically the following kind of construction could be adopted. That is, the rewriting device 20 may regularly transmit a response request to the control center 30 on the basis of timer interrupt processing or the like, and the control center 30 may perform a response. At this time, when there has ceased to be a response from the control center 30 before the chain of rewriting processing completes, the rewriting device 20 does not perform rewriting of the ECUs 11 through 14. If this is done, it becomes impossible to access an ECU from a different rewriting device using stolen access information.

Figure 2:
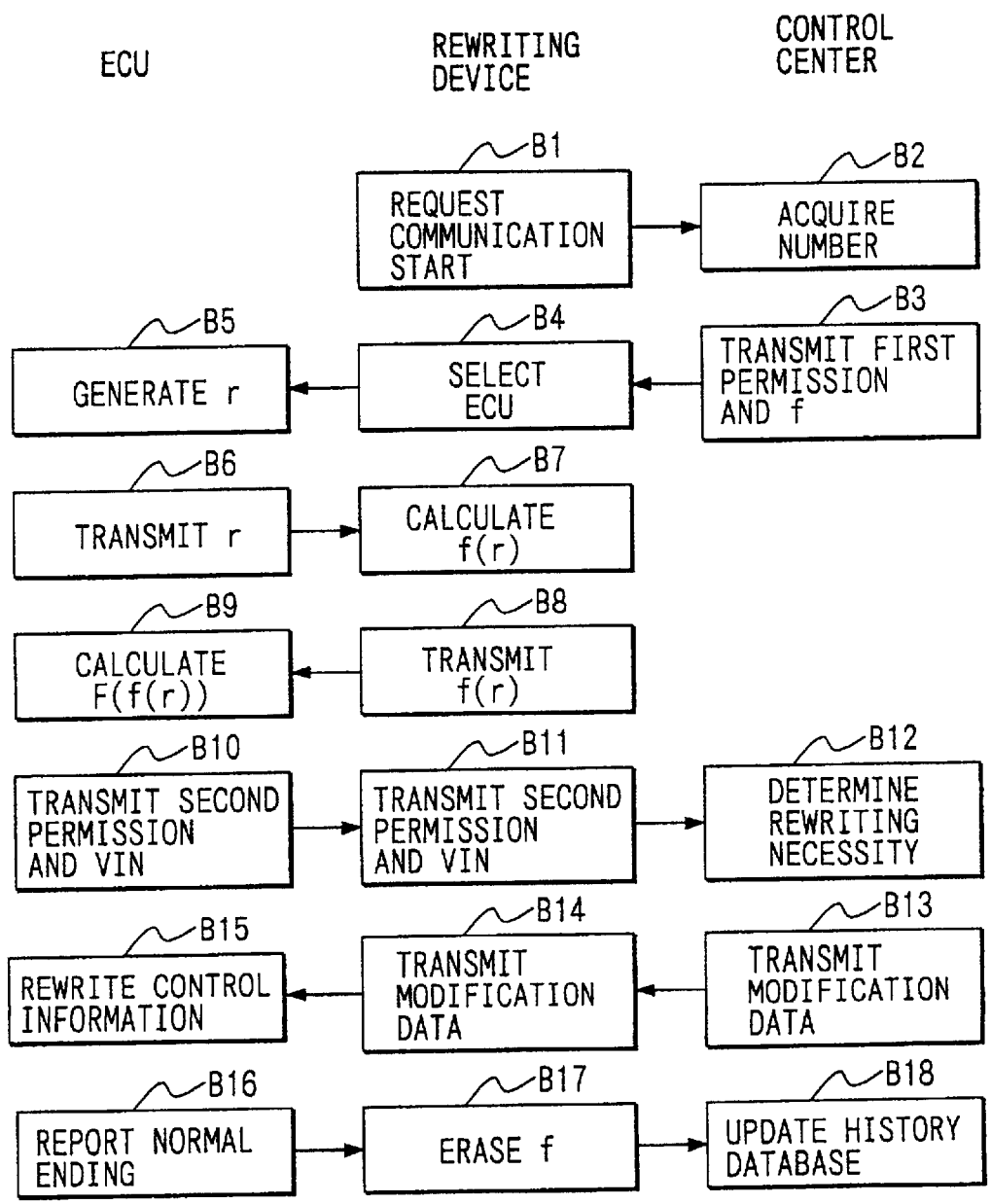
FIG. 2 is an operation diagram showing rewriting processing in the embodiment.

(3) In the case where control programs stored in the ECU 11 becomes out of order for some reason, the processing shown in FIG. 2 should be modified so that such control programs ma be rewritten.

In this instance, after executing B1 through B9 in FIG. 2, the ECU 11 reads out check sum of its control program and transmits it to the rewriting device 20 along with the second permission signal and the VIN code (B10). The rewriting device 20 transmits those received information to the control center 30 (B11). The control center 30 determines whether it is necessary to rewrite the control program based on the comparison of VIN code and check sum between the received ones and the pre-stored ones (12). Specifically, the control center 30 determines the version of the control program in the ECU 11 based on the received VIN code and determines whether the control program is normal by checking the received check sum of the control program. If the check sum differs from the pre-stored value, it determines that the control program is out of order or broken.

If the control center 30 determines based on the VIN code that the version of the control program has been changed, it transmits the modification data to the rewriting device 20 irrespective of the check sum determination result (B13). If the control center 30 determines that the version of the control program has not been changed but the control program is out of order, it transmits the original control program to the rewriting device 20. Thus, the control program in the ECU 11 can be renewed. It is of course possible to use key words or the like provided within the control program in place of using the check sum for detecting whether the control program has become out of order.

What is claimed is:

1. A control information rewriting system for a vehicle comprising:
    an electronic control unit mounted in the vehicle for a vehicle control and having control information stored in electrically rewritable nonvolatile memory for the vehicle control;
    a rewriting device connectable to the electronic control unit for rewriting the control information by transmitting predetermined identification information and associated information related to the predetermined identification information; and
    a control center in data communication with the rewriting device for receiving the identification information and the associated information from the rewriting device,
    wherein the control center includes
        storing means for storing predetermined access information, the predetermined identification information of the rewriting device and the associated information related to the predetermined identification information, and an association relationship between the predetermined identification information and the associated information; and
        legitimacy determining means in data communication with the rewriting device and for acquiring a relationship between the predetermined identification information and the associated information of the rewriting device and for comparing the acquired relationship with the association relationship between the predetermined identification information and the association information stored in the storing means, and transmitting the predetermined access information stored in the storing means to the rewriting device when the acquired relationship matches the association relationship stored in the storing means thereby to control rewriting operation of the rewriting device.

2. The control information rewriting system as in claim 1, wherein:
    the rewriting device acquires from the control center as the access information a function f specific to a function F stored in the electronic control unit, and transmits to the electronic control unit a function value f(r) specific to a predetermined value r transmitted from the electronic control unit; and
    the electronic control unit determines that the rewriting device is legitimate if a function value F(f(r)) specific to the function value f(r) transmitted from the rewriting device corresponds to the transmitted predetermined value r.

3. The control information rewriting system as in claim 2, wherein:
    the predetermined value r is a random number generated by the electronic control unit.

4. The control information rewriting system as in claim 1, wherein:
    the electronic control unit refuses access from the rewriting device for a fixed period, when determining a predetermined number of times that the rewriting device is not legitimate.

5. The control information rewriting system as in claim 1, wherein:
    the associated information is inputted to the rewriting device by a user every time a state wherein data communication with the control center is possible is established; and
    the rewriting device transmits the associated information inputted by the user to the control center together with the identification information.

6. The control information rewriting system as in claim 1, wherein:
    a data communication possible state is established between the control center and the rewriting device by way of a telephone network; and
    the control center acquires the telephone number of the rewriting device as the associated information, when the data communication possible state is established.

7. The control information rewriting system as in claim 1, wherein:
    the control center refuses access from the rewriting device for a fixed period when non-matching of the acquired relationship and the association relationship is determined by the legitimacy determining means a predetermined number of times.

8. The control information rewriting system as in claim 1, wherein:
    the control center further includes modification data storing means storing modification data of the control information; and
    the control center transmits the modification data to the rewriting device when the electronic control unit determines that the rewriting device is legitimate.

9. The control information rewriting system as in claim 8, wherein:
    the electronic control unit transmits vehicle information to the rewriting device when determining that the rewriting device is legitimate; and
    the control center further includes update history storing means storing an update history of the control information pertaining to the vehicle, refers to the update history stored in the update history storing means on the basis of the vehicle information when the vehicle information from the electronic control unit is transmitted by the rewriting device, determines necessity of rewriting of the control information in that vehicle, and transmits the modification data to the rewriting device when determining that rewriting is necessary.

10. The control information rewriting system as in claim 1, wherein:

the control center updates history specific to the vehicle when rewriting of control information is completed by the electronic control unit.

11. The control information rewriting system as in claim 1, wherein:
the rewriting device erases the predetermined access information when rewriting of the control information is completed by the electronic control unit.

12. The control information rewriting system as in claim 1, wherein:
the rewriting device stops rewriting of the control information after a data communication possible state is established between the rewriting device and the control center, if data communication between the rewriting device and the control center becomes impossible before rewriting of the control information is completed by the electronic control unit.

13. A control center for communication with a control information rewriting device which rewrites control information stored in a nonvolatile memory, the control center comprising:
storing means storing an association relationship between identification information of the rewriting device and associated information related to the identification information; and
legitimacy determining means in data communication with the rewriting device for acquiring an association relationship between the identification information and the associated information related to the identification information, and for transmitting rewriting permission to the rewriting device when the acquired association relationship corresponds to the association relationship stored in the storing means, thereby to control rewriting operation of the rewriting device.

14. The control center as in claim 13, wherein:
the storing means stores a history of rewriting of the control information.

15. The control center as in claim 13, further comprising:
control information transmitting means for transmitting modification data of the control information to the rewriting device.

16. The control center as in claim 14, further comprising:
determining means for determining whether the modification data should be transmitted to the rewriting device based on the history stored in the storing means.

17. The control center as in claim 14, further comprising:
history updating means for updating the history stored in the storing means when receiving data of completion of control information rewriting from the rewriting device.

18. A control center for communication with a control information rewriting device which rewrites control information stored in an electronic control unit, the control center comprising:
storing means storing an association relationship between identification information of the rewriting device and associated information related to the identification information;
a processing unit programmed to receive information from the rewriting device that is specific to a vehicle having the electronic control unit as well as an association relationship between identification information of the rewriting device and associated information related to the identification information to determine modification data to be used to rewrite the control information, and to transmit the determined modification data to the rewriting device,
wherein the processing unit is further programmed to determine whether the rewriting device is legitimate, and to permit the rewriting device to rewrite the modification data only upon determining that the rewriting device is legitimate, and
wherein the processing unit is further programmed to compare the stored association relationship stored in the storing means with the association relationship received from the rewriting device, and to determine that the rewriting device is legitimate when the compared association relationships match.

19. The control center as in claim 18, wherein:
the processing unit is further programmed to update a history of rewriting operation of the rewriting device.

20. The control center as in claim 19, wherein:
the processing unit is further programmed to determine whether rewriting of the control information is necessary by referring to the history of rewriting operation based on the information specific to the electronic control unit and received from the rewriting device, and transmit information indicative of completion of the rewriting operation to the rewriting device when determining that rewriting is not necessary.

21. A rewriting device for rewriting control information stored in an electronic control unit while communicating with an external device, the rewriting device comprising:
receiving means for receiving a rewriting permission from the external device;
processing execution means for executing predetermined processing with the electronic control unit in response to the receiving means receiving the rewriting permission from the external device;
control information transmitting means for acquiring the control information from the external device after the processing execution means executes the predetermined processing with the electronic control unit, and for transmitting the control information to the electronic control unit, wherein
the predetermined processing includes checking a match between the electronic control unit and the rewriting device by using access information received from the external device.

22. The rewriting device as in claim 21, further comprising:
identification information transmitting means for transmitting identification information of the rewriting device to the external device, so that the external device transmits the rewriting permission when the identification information is appropriate.

23. A control information rewriting system for a vehicle comprising:
an electronic control unit mounted in the vehicle for vehicle control and having control information stored in an electrically rewritable nonvolatile memory for vehicle control;
a rewriting device connectable to the electronic control unit for rewriting the control information stored in the electrically rewritable nonvolatile memory; and
a control center for performing data communication with the rewriting device and for storing access information required by the rewriting device to rewrite the control information in the electronic control unit,
wherein the rewriting device converts data received from the electronic control unit based on the access information received from the control center and transmits the converted data to the electronic control unit to enable the electronic control unit to determine whether the rewriting device is legitimate.

24. The control information rewriting system as in claim 23, wherein:
the rewriting device erases the access information received from the control center after rewriting has been completed normally in the electronic control unit.

25. A control information rewriting system for a vehicle comprising:
an electronic control unit mounted in the vehicle for a vehicle control and having control information stored in electrically rewritable nonvolatile memory for vehicle control;
a rewriting device connectable to the electronic control unit for rewriting the control information; and
a control center for performing data communication with the rewriting device and for storing predetermined access information necessary for the rewriting device to rewrite the control information,
wherein the electronic control unit determines whether the rewriting device is legitimate by receiving information which is formed by the rewriting device based on the predetermined access information received from the control center.

26. The control information rewriting system as in claim 25, wherein:
the electronic control unit outputs predetermined data to the rewriting device, receives converted data which is converted from the predetermined data by the rewriting device based on the access information, and determines the legitimacy of the rewriting device by determining whether the converted data is formed from the predetermined data.

27. The control information rewriting system as in claim 25, wherein:
the electronic control unit is set to a condition for waiting for an input of the control information to be rewritten into the nonvolatile memory when determining that the rewriting device is legitimate.

28. The control information rewriting system as in claim 25, wherein:
the electronic control unit transmits specific information specific to a vehicle to the rewriting device; and
the rewriting device determines the control information to be transmitted to the electronic control unit based on the specific information.

29. The control information rewriting system as in claim 28, wherein:
the control information to be transmitted to the electronic control unit is determined by the control center based on the specific information.

30. A control information rewriting system for a vehicle comprising:
an electronic control unit mounted in the vehicle for vehicle control and having a control program stored in an electrically rewritable nonvolatile memory for the vehicle control;
a rewriting device connectable to the electronic control unit for rewriting the control program; and
a control center for performing data communication with the rewriting device,
wherein the control center is programmed to determine whether the control program has already been rewritten or is not broken by checking a check sum of the control program transmitted from the electronic control unit through the rewriting device along with vehicle specific information, and to transmit a new control program to the rewriting device so that the new control program is rewritten in the nonvolatile memory when determining that the control program has not been rewritten or is broken.

31. The control information rewriting system as in claim 1, wherein:
the rewriting device is provided apart from the vehicle mounted with the electronic control unit.

32. The control information rewriting system as in claim 23, wherein:
the rewriting device is provided apart from the electronic control unit mounted in the vehicle.

33. The control information rewriting system as in claim 1, wherein the control center is located remotely from the electronic control unit mounted in the vehicle and from the rewriting device.

34. The control information rewriting system as in claim 13, wherein the control center is located remotely from the rewriting device.

35. The control information rewriting system as in claim 18, wherein the control center is located remotely from the rewriting device.

36. The control information rewriting system as in claim 21, wherein the rewriting device is provided apart from the elctronic control unit.

37. The control information rewriting system as in claim 25, wherein the control center is located remotely from the electronic control unit mounted in the vehicle and from the rewriting device.

38. The control information rewriting system as in claim 30, wherein the control center is located remotely from the electronic control unit mounted in the vehicle and from the rewriting device.

* * * * *